United States Patent [19]

Yano

[11] Patent Number: 5,165,719
[45] Date of Patent: Nov. 24, 1992

[54] SHOULDER BELT POSITIONAL ADJUSTMENT DEVICE FOR A SEATBELT

[75] Inventor: Hideaki Yano, Shiga, Japan

[73] Assignee: Takata Corporation, Tokyo, Japan

[21] Appl. No.: 676,332

[22] Filed: Mar. 28, 1991

[30] Foreign Application Priority Data

Apr. 11, 1990 [JP] Japan .................................... 2-95496

[51] Int. Cl.⁵ ............................................. B60R 22/20
[52] U.S. Cl. ..................................... 280/808; 280/801
[58] Field of Search ....................... 280/801, 804, 808; 297/483; 16/93 R, DIG. 6

[56] References Cited

U.S. PATENT DOCUMENTS

| | | |
|---|---|---|
| 4,547,717 | 10/1985 | Radermacher et al. ......... 280/804 X |
| 4,747,617 | 5/1988 | Magyar et al. ....................... 280/808 |
| 4,834,427 | 5/1989 | Takada ................................ 280/808 |
| 4,861,071 | 8/1989 | Takada ................................ 280/808 |
| 4,962,948 | 10/1990 | Ono ..................................... 280/804 |
| 4,993,745 | 2/1991 | Ono ................................. 280/808 X |

FOREIGN PATENT DOCUMENTS

| | | |
|---|---|---|
| 3620202 | 12/1987 | Fed. Rep. of Germany ...... 280/808 |
| 3744577 | 7/1989 | Fed. Rep. of Germany ...... 280/808 |
| 2176091 | 12/1986 | United Kingdom ................ 280/808 |

*Primary Examiner*—Charles A. Marmor
*Assistant Examiner*—Tamara L. Graysay
*Attorney, Agent, or Firm*—Kanesaka and Takeuchi

[57] ABSTRACT

A shoulder belt positional adjustment device for a seatbelt comprises a belt anchor adapted to loosely receive a shoulder belt, an anchor support block for supporting the belt anchor, a guide rail for slidably holding the anchor support block, and a screw shaft extending along the longitudinal axis of the guide rail and threaded with the anchor support block, whereby the screw shaft is rotated to move the anchor support block along the guide rail. The anchor support block has a nut element threaded on the screw shaft, and a slider slidably mounted to the guide rail. The nut element and the slider are so engaged as to move together. A resilient member is disposed among the nut element, the slider and the guide rail to resiliently contact the nut element, the slider and the guide rail.

8 Claims, 6 Drawing Sheets

FIG. IA
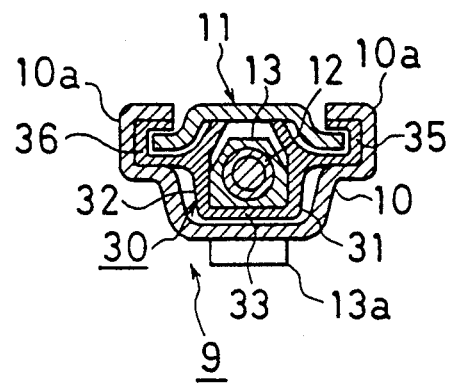
FIG. ID
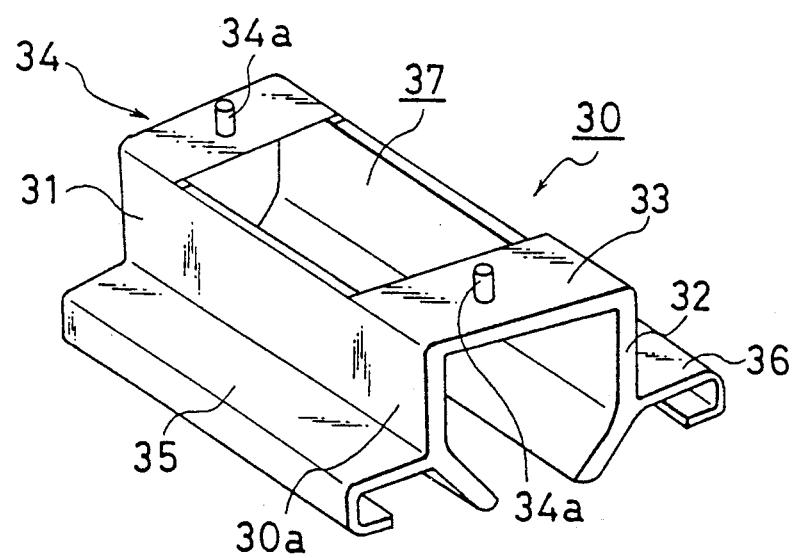

FIG.4A
FIG.4B
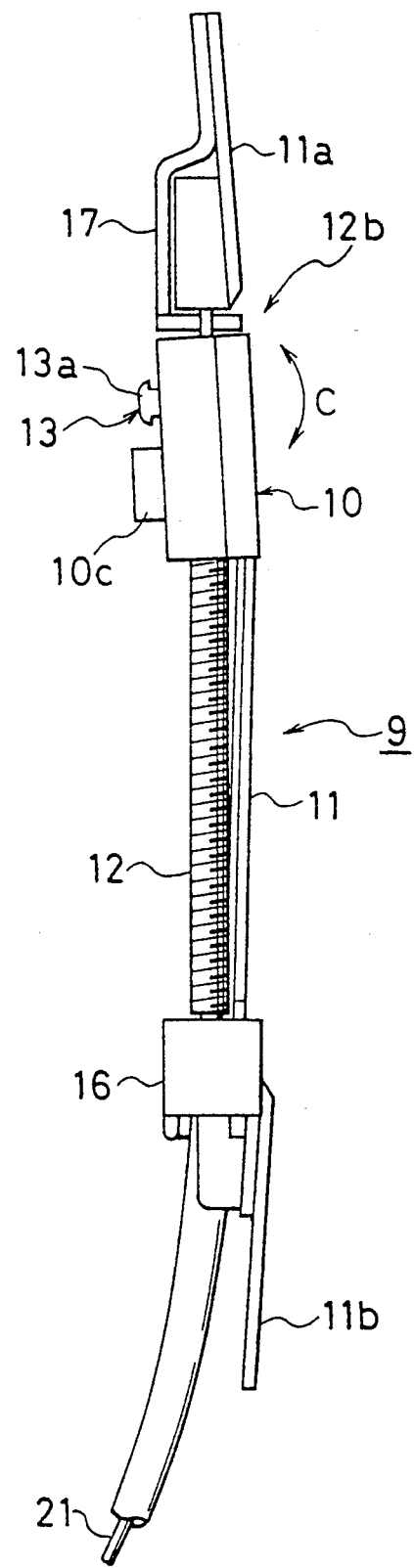
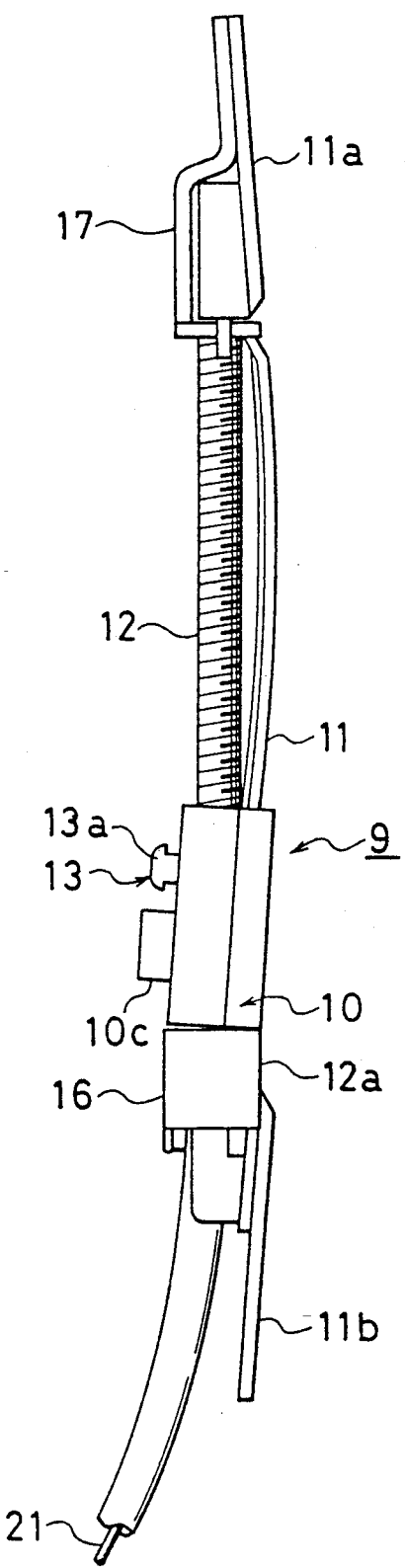

5,165,719

SHOULDER BELT POSITIONAL ADJUSTMENT DEVICE FOR A SEATBELT

FIELD OF THE INVENTION AND RELATED ART STATEMENT

This invention relates to a seatbelt system for protecting and restraining a vehicle occupant in a seat and more particularly, to a shoulder belt positional adjustment device for use with a seatbelt.

Generally, a motor vehicle includes a seatbelt to protect and restrain an occupant in a seat in the event of a vehicle collision or emergency.

The seatbelt must have a sufficient strength to withstand a sudden load, the magnitude of which is several ten times greater than the weight of an occupant to be restrained. Therefore, it is preferable that a lap belt safely engages a hipbone, and that a shoulder belt is located between the shoulder joints and the neck.

Those who are to be restrained by a seatbelt include children and adults and considerably differ in size. Also, they adjust their own seats in a different manner.

There has previously been proposed a shoulder belt positional adjustment device of a seatbelt, wherein the position of a shoulder belt anchor is adjusted to optimize retraint of each vehicle occupant.

One known shoulder belt positional adjustment device is illustrated in FIGS. 5A, 5B and 6.

As illustrated, a shoulder belt positional adjustment device 1 includes a substantially U-shaped mount 2 attached to a vehicle center pillar 8 and having opposite bent members 2a and 2b, a screw shaft 3 rotatably mounted between the bent members 2a and 2b, and an anchor support block 4 threaded on the screw shaft 3 and moved in the direction of the arrow A along two guide rails 2d and 2d. In FIG. 5B, 5 is a hole through which a shoulder belt anchor 6 is mounted to loosely hold a shoulder belt as shown in FIG. 6.

In the shoulder belt positional adjustment device 1 thus constructed, the anchor support block 4 includes a nut for threaded engagement with the screw shaft 3. Rotation of the screw shaft 3 causes the anchor support block 4 to move along the guide rails 2d, 2d.

In the shoulder belt positional adjustment device, the anchor support block 4 may contact the guide rails 2d, 2d to make mechanical noise while the screw shaft is rotated to move the anchor support block 4. A clearance is inevitably defined between the anchor support block 4 and the guide rails 2d, 2d. While the anchor support block 4 is moving, the anchor support block 4 and the guide rails 2d, 2d come into contact with one another to cause mechanical noise. Such mechanical noise makes an occupant in the vehicle compartment uncomfortable. Also, the occupant may misunderstand that such mechanical noise results from mechanical failure.

OBJECT AND SUMMARY OF THE INVENTION

It is an object of the present invention to provide a shoulder belt positional adjustment device which enables smooth movement of an anchor support block along a guide rail, and which substantially reduces mechanical noise when the position of a shoulder belt is adjusted, and improves the comfortableness of a vehicle occupant in a compartment.

In the present invention, an anchor support block is moved as the screw shaft is rotated. The anchor support block includes a nut element threaded on the screw shaft, and a slider slidable on a guide rail. The nut element and the slider are movable together A resilient member is disposed among the nut element, the slider and the guide rail so as to resiliently contact them.

It is preferable that the resilient member is integrally formed of synthetic resin.

With the shoulder belt positional adjustment device of the present invention, the resilient member is resiliently in contact with not only the anchor support block, namely, the nut element and the slider, but the guide rail as well.

Accordingly, even if the nut element and the slider hit the guide rail while the screw shaft is rotated to move the anchor support block, the resulting vibrations are absorbed by the resilient element. This results in a substantial decrease in mechanical noise due thereto.

BRIEF DESCRIPTION OF THE DRAWINGS

FIG. 1A is a sectional view showing the principal part of each of a screw shaft and an anchor support block used in one embodiment of the invention;

FIG. 1D is a perspective view of a resilient member;

FIGS. 4A and 4B are views showing the slider and the nut in use;

DESCRIPTION OF THE PREFERRED EMBODIMENTS

Figure 1B:
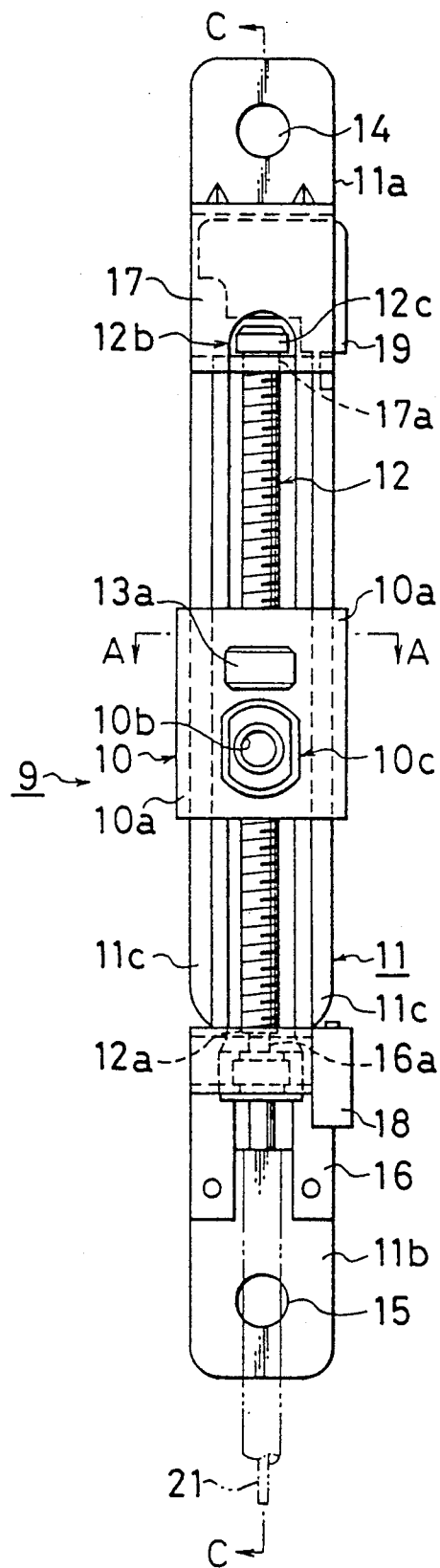
FIG. 1B is a front view of a shoulder belt positional adjustment device for use with a seatbelt according to one embodiment of the invention.
Figure 1C:
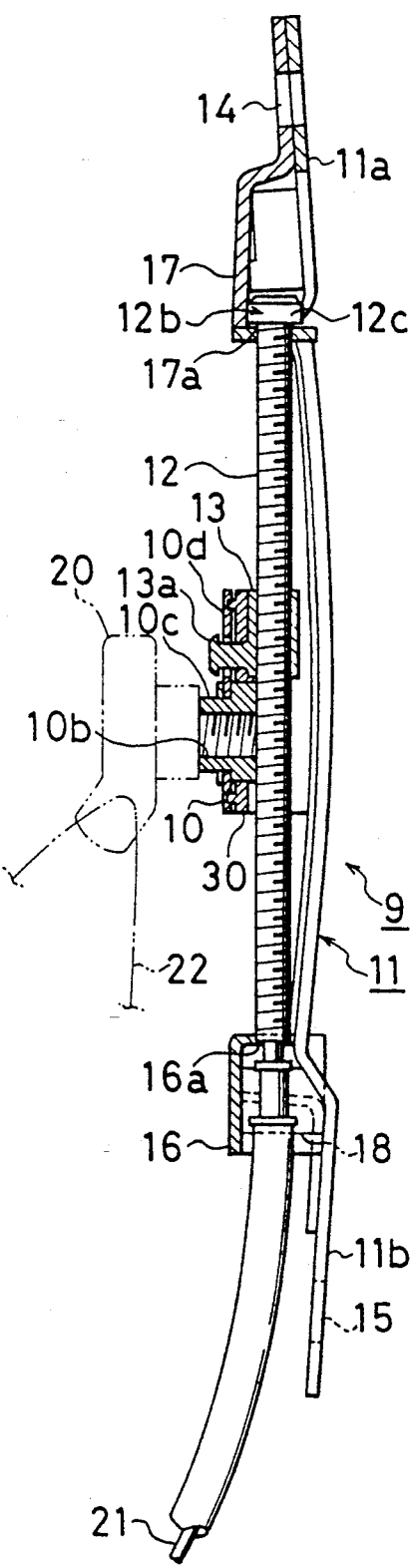
FIG. 1C is a sectional side view of the device shown in FIG. 1B.

FIG. 1A is a sectional view taken along the line A—A of FIG. 1B, showing, on an enlarged scale, the manner in which an anchor support block is engaged with a screw shaft in a shoulder belt positional adjustment device made according to one embodiment of the present invention. FIG. 1B is a front view of the shoulder belt positional adjustment device for use with a seatbelt. FIG. 1C is a sectional view taken along the line C—C in FIG. 1B. FIG. 1D is a perspective view of a resilient member.

As illustrated, a shoulder belt positional adjustment device 9 of a seatbelt includes a slider 10 by which a belt anchor 20 is supported. The slider 10 is slidably held by a guide rail 11. A screw shaft 12 has opposite ends rotatably connected to the guide rail 11. The upper end (upper one in FIGS. 1B and 1C) of the screw shaft 12 is suspended by the guide rail 11. A nut element 13 is threaded on the screw shaft 12 and includes a projection 13a loosely fit in the slider 10. When the screw shaft 12 is rotated, the nut element 13 and the slider 10 are moved together along the guide rail 11. A resilient member 30 is included to surround the nut element 13.

The nut element 13 and the slider 10 together form an anchor support block. In the drawings, 18 and 19 are sensor switches adapted to sense the position of the upper and lower ends of the slider 10.

In the illustrated embodiment, the guide rail 11 is bent to correspond in shape to a vehicle center pillar and has upper and lower ends 11a and 11b. Two holes 14 and 15 are formed in the upper and lower ends of the guide rail 11 to receive bolts so as to secure the device to the center pillar. The guide rail 11 includes two guide elements 11c and 11c at its opposite sides. The guide elements 11c and 11c extend between the upper and lower ends 11a and 11b of the guide rail 11. The slider 10 is slid along the guide elements 11c and 11c. Mounts 16 and 17 are provided adjacent to the upper and lower ends 11a and 11b of the guide rail 11 so as to rotatably mount the ends of the screw shaft 12.

The mount 16 supports the lower end 12a of the screw shaft 12 and has an inverted U-shape as viewed in front. The mount 16 has a horizontal upper end in which an opening 16a is formed to receive the lower end 12a of the screw shaft 12. The mount 16 is frangible and is more deformable or rupturable than the screw shaft 12. When the mount 16 is deformed or ruptured, the lower end 12a of the screw shaft 12 is released therefrom.

The mount 17 supportingly mounts the upper end 12b of the screw shaft 12. The mount 17 is rigid and has an opening 17a through which the upper end 12b of the screw shaft 12 is suspended. A downward load is applied to the screw shaft 12 as well as the mount 17 rather than the mount 16.

The screw shaft 12 extends substantially parallel to the guide rail 11 between the two mounts 16 and 17. The upper end 12b of the screw shaft 12 is formed with a collar 12c supported on the opening 17a. A wire 21 extends between the lower end 12a of the screw shaft 12 and a motor (not shown) to transmit a driving force.

Figure 2A:
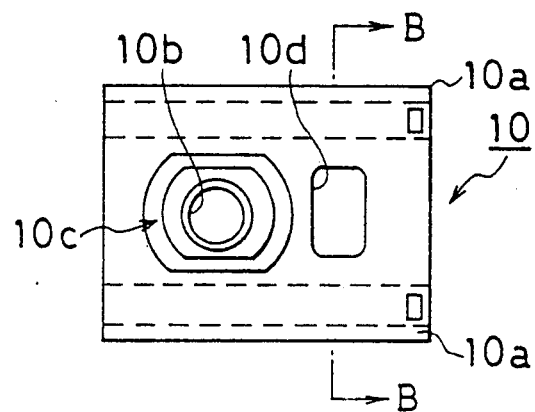
FIG. 2A is a top plan view of a slider.
Figure 2B:
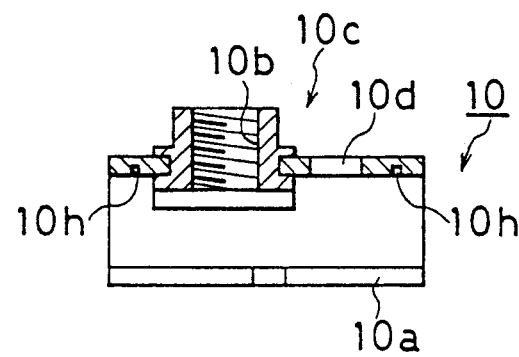
FIG. 2B is a sectional view of the slider.
Figure 2C:
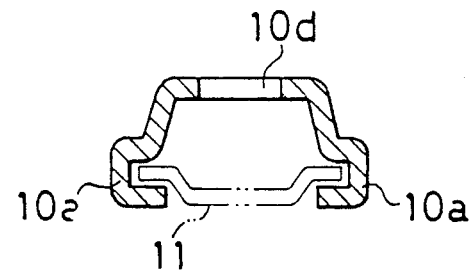
FIG. 2C is a sectional view taken along the line B—B of FIG. 2A.

FIGS. 2A and 2B are top plan and sectional views of the slider 10, respectively. FIG. 2C is a sectional view taken along the line B—B in FIG. 2A.

The slider 10 has an inverted U-shaped section and includes gripping portions at its opposite sides to slidably grip the guide elements 11c, 11c of the guide rail 11. The upper surface of the slider 10 is formed with an opening through which a sleeve or anchor support portion 10c extends and another opening 10d through which the projection 13a of the nut element 13 is loosely fit as will later be explained in detail. The anchor support portion 10c includes a female thread 10b to threadably receive the belt anchor 20.

As shown in FIG. 1D, the resilient member 30 includes a generally U-shaped body 34 having a pair of opposite side plates 31 and 32 and a connecting plate 33 extending between the side plates 31 and 32, and a pair of extensions 35 and 36 extending outwardly from the side plates 31 and 32.

The extensions 35 and 36 have free ends bent to a U configuration and engaged with the guide elements 11c, 11c as shown in FIG. 1A. The extensions 35 and 36 are also fit within the grip portions 10a, 10a of the slider 10, respectively.

The opposite side plates 31 and 32 of the body 34 have free ends bent inwardly toward each other to embrace the nut element 13. The distance between the side plates 31 and 32 is sightly greater than the width of the nut element 13, so that the side plates 31 and 32 may resiliently grip the nut element 13 from its opposite sides (In other words, the opposite side plates 31 and 32 resiliently contact the nut element 13). Also, the opposite side plates 31 and 32 are sized such that their free ends are resiliently pressed against the guide rail 11.

The connecting plate 33 of the body 34 has a window 37 through which the anchor support portion 10c extends.

The body 34 has two projections 34a received in two recesses 10h (see FIG. 2B) formed in the inner surface of the slider 10.

Figure 3A:
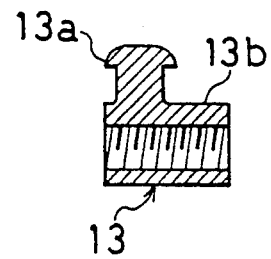
FIG. 3A is a vertical sectional view of a nut element.
Figure 3B:
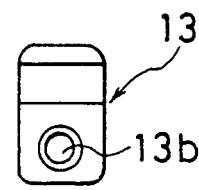
FIG. 3B is a side view of the nut element.
Figure 5A:
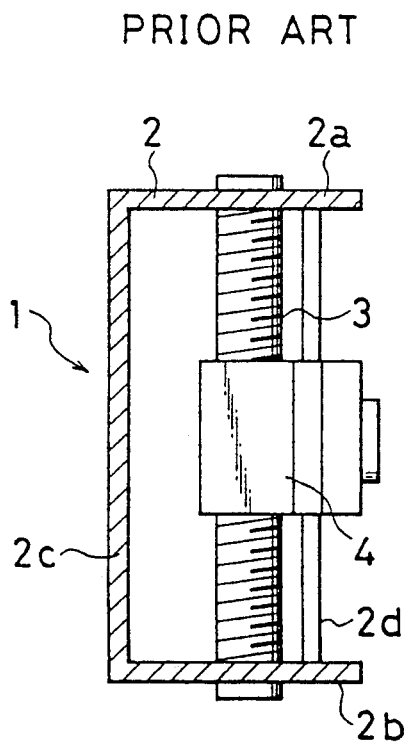
FIG. 5A is a front view of a conventional shoulder belt positional adjustment device for use with a seatbelt.
Figure 5B:
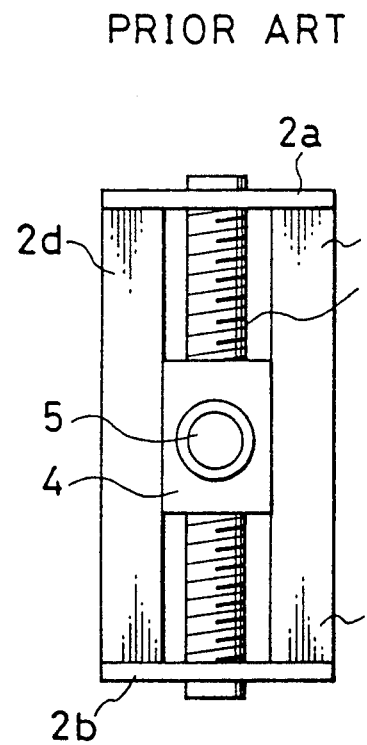
FIG. 5B is a side view of the device shown in FIG. 5A.
Figure 6:
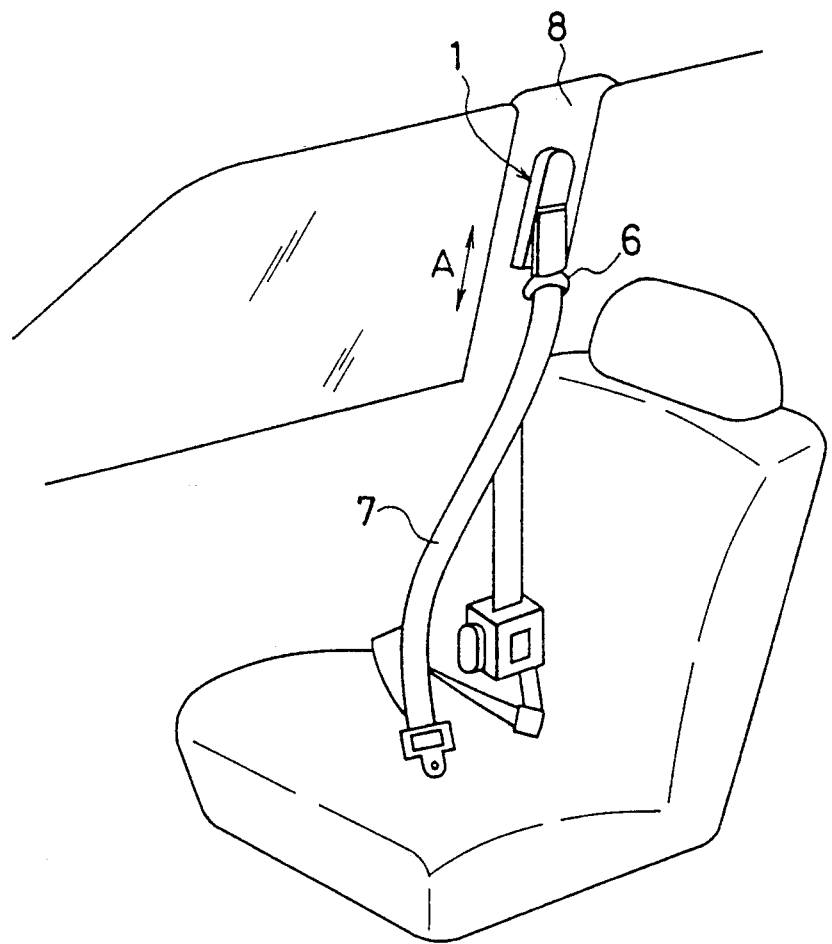
FIG. 6 is a schematic view showing the manner in which the shoulder belt positional adjustment device of a seatbelt is mounted to a vehicle body.

FIGS. 3A and 3B are a vertical sectional view and a side view of the nut element 13, respectively.

The nut element 13 includes a rectangular projection 13a loosely fit within the opening 10d of the slider 10 and a female thread 13b threaded onto the screw shaft 12. The projection 13a is engaged with the opening 10d so as to prevent the nut element 13 from rotating about the axis of the screw shaft 12. As such, the nut element 13 is moved vertically along the guide rail 11 as the screw shaft 12 is rotated.

Since the projection 13a is loosely fit in the opening 10d, the slider 10 is movable along the arcuate guide rail 11 while the nut element 13 is moved straight along the screw shaft 12.

FIG. 4A shows the nut element 13 and the slider 10 positioned at the upper end 12b of the screw shaft 12. Under the circumstances, the nut element 13 is moved straight along the guide rail 12 if the motor (not shown) is energized to rotate the screw shaft in one directic through the transmission wire 21. At this time, the slider 13 is moved along the arcuate guide rail 11. FIG. 4B shows the slider 10 and the nut element 13 in their lowermost position. When the screw shaft 12 is rotated in a reverse direction, the nut element 13 and the slider 10 are again moved toward the upper end 12b of the screw shaft 12. Now that the projection 13 is loosely fit in the opening 10d, the slider can be moved horizontally toward and away from the nut element 13 and can be rotated in the direction of the arrow C.

In FIG. 1C, 22 is a shoulder belt loosely fit in the belt anchor 20.

While the slider 10 and the nut element 13 are moved up and down as the screw shaft 12 is rotated, contact between the nut element 13 and the slider 10 and the guide rails causes noise.

However, the resilient member 30 is disposed between the nut element 13 and the slider 10 and also resiliently contacts with the guide rail 11. This resilient element 30 thus serves to absorb vibrations arising from the nut element 13 and the slider 10. Movement of the anchor support block, namely, the nut element 13 and the slider 10, barely causes noise.

In the present invention, the resilient element 30 has end surfaces 30a which may extend beyond the slider 10 so as to resiliently contact the mounts 16 and 17.

What is claimed is:

1. A shoulder belt positional adjustment device for a seatbelt, comprising:

a guide rail having a shape corresponding to a center pillar of a vehicle and bolt holes at upper and lower ends, said guide rail being adapted to be fixed to the center pillar by means of bolts passing through the bolt holes, said guide rail having guide elements at opposite sides thereof, said guide elements extending between the upper and lower ends thereof, an anchor support block including a slider for slidably engaging the guide rail, said slider having a substantially U-shaped transverse section and grip portions at opposite sides thereof for slidably gripping the guide elements thereat, and a nut element engaging the slider to allow the slider to move along the guide rail, a belt anchor adapted to loosely receive a shoulder belt and being supported by the slider, a screw shaft extending along and substantially parallel to a longitudinal direction of the guide rail and threaded with the nut element of the anchor support block, said screw shaft, when rotated, allowing the anchor support block to move along the guide rail, and a resilient member disposed among the nut element, the slider and the guide rail to resiliently contact among them to dampen vibration arising from the nut element and the slider, said resilient member including a body and extensions, said body having a substantially U-shaped section and including a pair of opposite side plates and a connecting plate extending between the side plates, said extensions extending outwardly from the side plates.

2. A shoulder belt positional adjustment device according to claim 1, wherein said resilient member is integrally made of synthetic resin.

3. A shoulder belt positional adjustment device according to claim 1, wherein said extensions have U-shaped free ends bent to receive the guide elements of the guide rail, and said extensions are received in the grip portions of said slider.

4. A shoulder belt positional adjustment device according to claim 3, wherein said opposite side plates have free ends extending inwardly toward each other so as to receive said nut element in said body, and wherein a distance between the opposite side plates is slightly greater than a width of the nut element so that the side plates resiliently grip the nut element from opposite sides and resiliently contact the nut element.

5. A shoulder belt positional adjustment device according to claim 3, wherein said opposite side plates are so sized that free ends of the side plates are resiliently pressed against the guide rail.

6. A shoulder belt positional adjustment device for a seatbelt, comprising:

a guide rail adapted to be fixed to a vehicle and having guide elements at opposite sides thereof, an anchor support block including a slider having gripping portions at opposite sides thereof for slidably gripping the guide elements of the guide rail, and a nut element formed separately from the slider and engaging the slider such that the slider is moved along the guide rail by the nut element, a belt anchor adapted to loosely receive a shoulder belt and being supported by the slider, a screw shaft extending along a longitudinal direction of the guide rail and threaded with the nut element of the anchor support block, said screw shaft, when rotated, allowing the anchor support block to move along the guide rail, and a resilient member including a body formed of a pair of opposite side plates and a connecting plate extending between the side plates, and extensions extending outwardly from the side plates, said resilient member being disposed inside the slider for covering parts of the guide elements of the guide rail and the nut element to allow the slider, the nut element and the guide rail to resiliently contact with each other to dampen vibration arising from the nut element and the slider.

7. A shoulder belt positional adjusting device according to claim 6, wherein said extensions have free ends to receive the guide elements therein, said free ends being received in the grip portions of the slider.

8. A shoulder belt positional adjusting device according to claim 7, wherein said opposite side pates have free ends extending inwardly toward each other to receive the nut element in the body.

* * * * *